(12) United States Patent
Song (10) Patent No.: US 7,522,183 B2
(45) Date of Patent: Apr. 21, 2009

(54) AUTOMATIC CONTROL OF IMAGE TRANSMISSION IN A MOBILE COMMUNICATION DEVICE

(75) Inventor: Kuk-Jin Song, Seoul (KR)

(73) Assignee: LG Electronics, Inc., Seoul (KR)

( * ) Notice: Subject to any disclaimer, the term of this patent is extended or adjusted under 35 U.S.C. 154(b) by 834 days.

(21) Appl. No.: 10/882,708

(22) Filed: Jun. 30, 2004

(65) Prior Publication Data

US 2005/0003852 A1 Jan. 6, 2005

(30) Foreign Application Priority Data

Jul. 4, 2003 (KR) .................. 10-2003-0045341

(51) Int. Cl.
*H04N 7/14* (2006.01)

(52) U.S. Cl. .............. 348/14.12; 455/550.1; 455/575.1

(58) Field of Classification Search ............. 455/575.3, 455/556.1, 567, 550.1; 379/368; 348/14.12, 348/14.01–14.09
See application file for complete search history.

(56) References Cited

U.S. PATENT DOCUMENTS

| 5,491,507 | A | | 2/1996 | Umezawa et al. | |
|---|---|---|---|---|---|
| 5,983,119 | A | * | 11/1999 | Martin et al. | ............ 455/575.7 |
| 6,281,925 | B1 | | 8/2001 | Kosaka | |
| 6,310,609 | B1 | * | 10/2001 | Morgenthaler | .............. 379/368 |
| 6,687,515 | B1 | * | 2/2004 | Kosaka | ..................... 455/556.1 |
| 7,268,799 | B2 | * | 9/2007 | Patino et al. | ............. 455/575.3 |
| 7,292,875 | B2 | * | 11/2007 | Chan et al. | ............... 455/550.1 |
| 2001/0023187 | A1 | | 9/2001 | Wilhelm | |
| 2002/0163524 | A1 | * | 11/2002 | Dutta | ......................... 345/589 |
| 2003/0013496 | A1 | * | 1/2003 | Kim et al. | .................... 455/567 |
| 2004/0166829 | A1 | * | 8/2004 | Nakae et al. | ................ 455/403 |
| 2005/0041139 | A1 | * | 2/2005 | Lowles | ....................... 348/362 |

FOREIGN PATENT DOCUMENTS

| EP | 0 912 031 A2 | 4/1999 |
|---|---|---|
| EP | 1058465 A2 | 12/2000 |
| EP | 1 085 731 A2 | 3/2001 |
| EP | 1 109 382 A2 | 6/2001 |
| JP | 11-027375 | 1/1999 |
| JP | 2001-054085 | 2/2001 |
| KR | 1020030027452 A | 4/2003 |
| WO | WO 02-37848 A1 | 5/2002 |

* cited by examiner

*Primary Examiner*—Curtis Kuntz
*Assistant Examiner*—Maria El-Zoobi
(74) *Attorney, Agent, or Firm*—Lee, Hong, Degerman, Kang & Waimey (57) ABSTRACT

A communication device is adapted to sense the relative light intensity around a first portion associated with reduced light intensity during communication conducted in proximity to a user's body. The communication device suspends or resumes a previously suspended image transmission portion of an ongoing image/voice transmission based on the sensed relative light intensity. The communication device is also adapted to allow an image transmission portion of an ongoing image/voice transmission to proceed based on the sensed relative light intensity.

21 Claims, 7 Drawing Sheets

AUTOMATIC CONTROL OF IMAGE TRANSMISSION IN A MOBILE COMMUNICATION DEVICE

CROSS-REFERENCE TO RELATED APPLICATIONS

Pursuant to 35 U.S.C. § 119(a), this application claims the benefit of earlier filing date and right of priority to Korean Patent Application No. 10-2003-0045341, filed on Jul. 4, 2003, the contents of which is hereby incorporated by reference in its entirety.

BACKGROUND OF THE INVENTION

1. Field of the Invention

The present invention relates generally to image transmission and more particularly to automatic control of image transmission in a mobile communication device.

2. Description of the Related Art

Figure 1A:
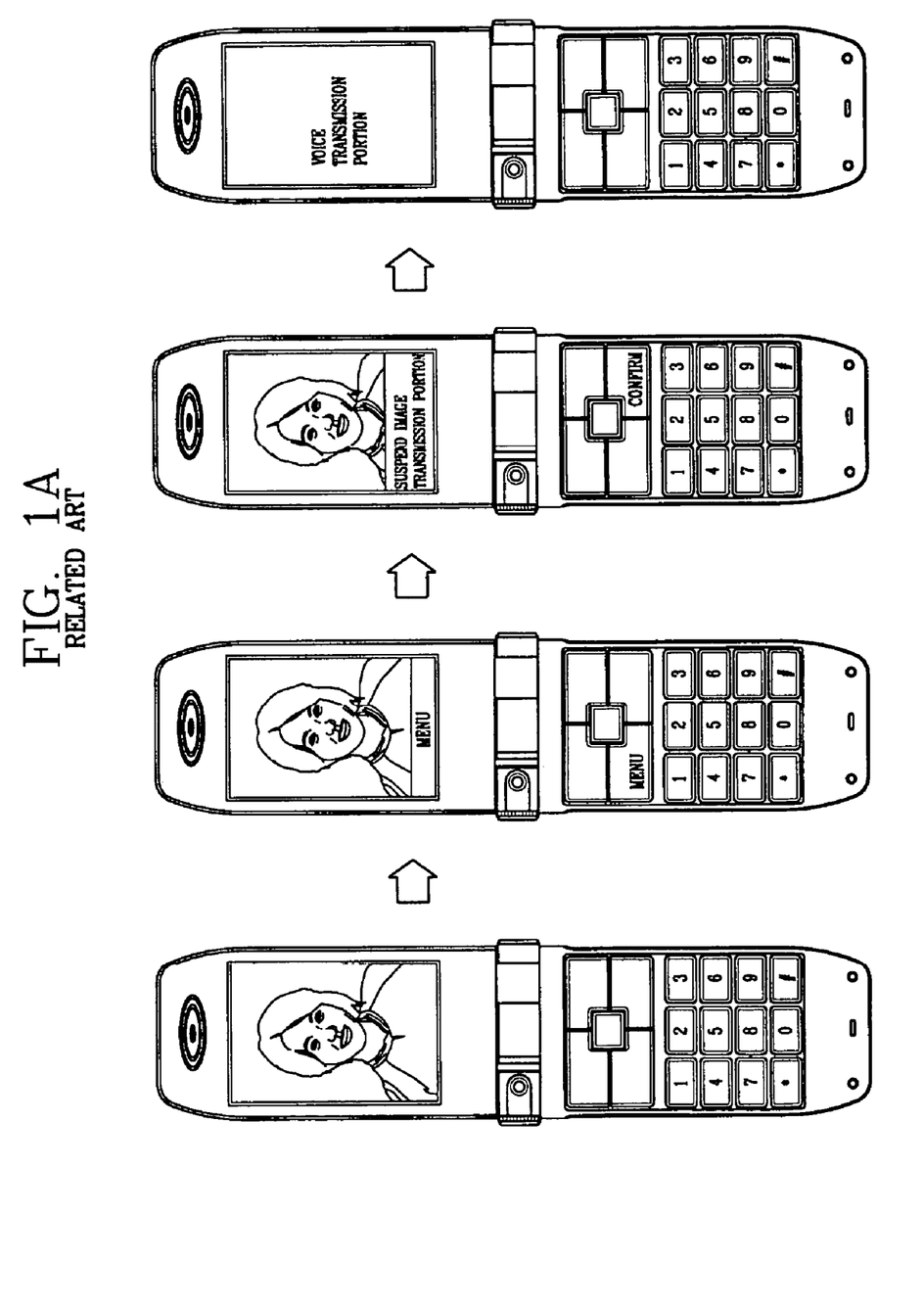
FIGS. 1A-1B schematically illustrate conventional manual control of image transmission in a mobile communication device.
Figure 1B:
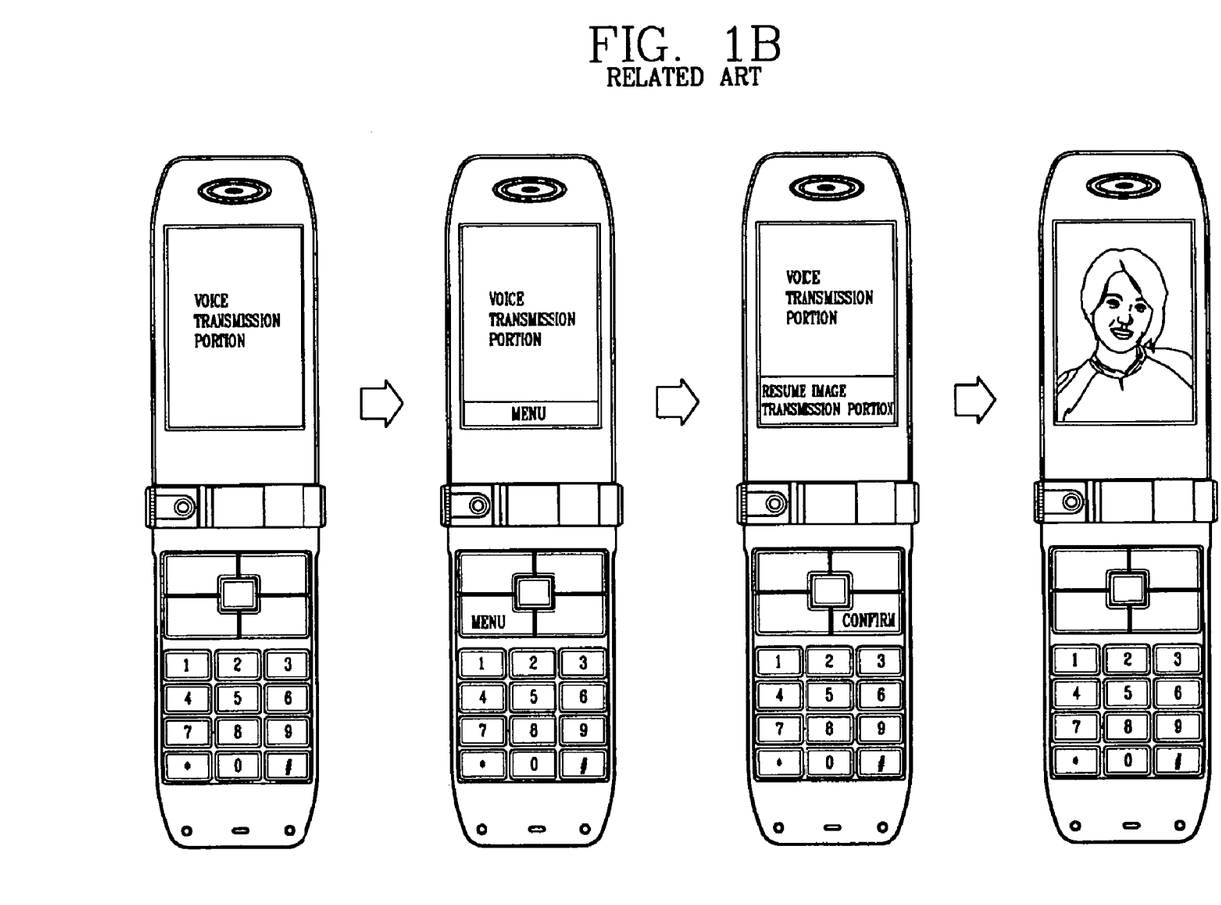

As schematically shown in FIGS. 1A-1B, conventional image transmission by way of a mobile communication device requires manual intervention by the user. Specifically, the user is obliged to manually suspend an image transmission portion during an ongoing simultaneous image/voice transmission using menu functions on the mobile communication device keypad, if so desired by the user. The user also has to manually resume a previously suspended image transmission portion during an ongoing simultaneous image/voice transmission using menu functions on the mobile communication device keypad. Such manual intervention may cause inconvenience and/or irritation on part of the user.

SUMMARY OF THE INVENTION

In accordance with one aspect of the present invention, a communication device is adapted to sense the relative light intensity around a first portion associated with reduced light intensity during communication conducted in proximity to a user's body. The communication device is also adapted to suspend or resume a previously suspended image transmission portion of an ongoing image/voice transmission based on the sensed relative light intensity. The communication device is further adapted to allow an image transmission portion of an ongoing image/voice transmission to proceed based on the sensed relative light intensity.

In accordance with another aspect of the present invention, a communication device comprises means for detecting the relative light intensity in the vicinity of a first portion associated with reduced light intensity during communication conducted in proximity to a user's body, means for processing the detected relative light intensity, and at least one controller adapted to suspend or resume a previously suspended image transmission portion of an ongoing image/voice transmission based on the processed relative light intensity. The controller is also adapted to allow an image transmission portion of an ongoing image/voice transmission to proceed based on the processed relative light intensity.

The detecting means may include at least one light intensity detector receiving input from at least one optical sensor. The optical sensor may be disposed in the vicinity of at least one device speaker. The processing means may include at least one processor receiving input from the light intensity detector. The controller is operatively coupled to the processor.

In accordance with yet another aspect of the present invention, a communication method comprises the steps of detecting the relative light intensity in the vicinity of a first communication device portion associated with reduced light intensity during communication conducted in proximity to a user's body, processing the detected relative light intensity, and suspending or resuming a previously suspended image transmission portion of an ongoing image/voice transmission based on the processed relative light intensity. The communication method also comprises the step of allowing an image transmission portion of an ongoing image/voice transmission to proceed based on the processed relative light intensity.

These and other aspects of the present invention will become apparent from a review of the accompanying drawings and the following detailed description of the present invention.

BRIEF DESCRIPTION OF THE DRAWINGS

The present invention is generally shown by way of reference to the accompanying drawings as follows.

DETAILED DESCRIPTION OF THE PREFERRED EMBODIMENTS

Some embodiments of the present invention will be described in detail with reference to the related drawings of FIGS. 1-5. Additional embodiments, features and/or advantages of the invention will become apparent from the ensuing description or may be learned by practicing the invention.

In the figures, the drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 2A:
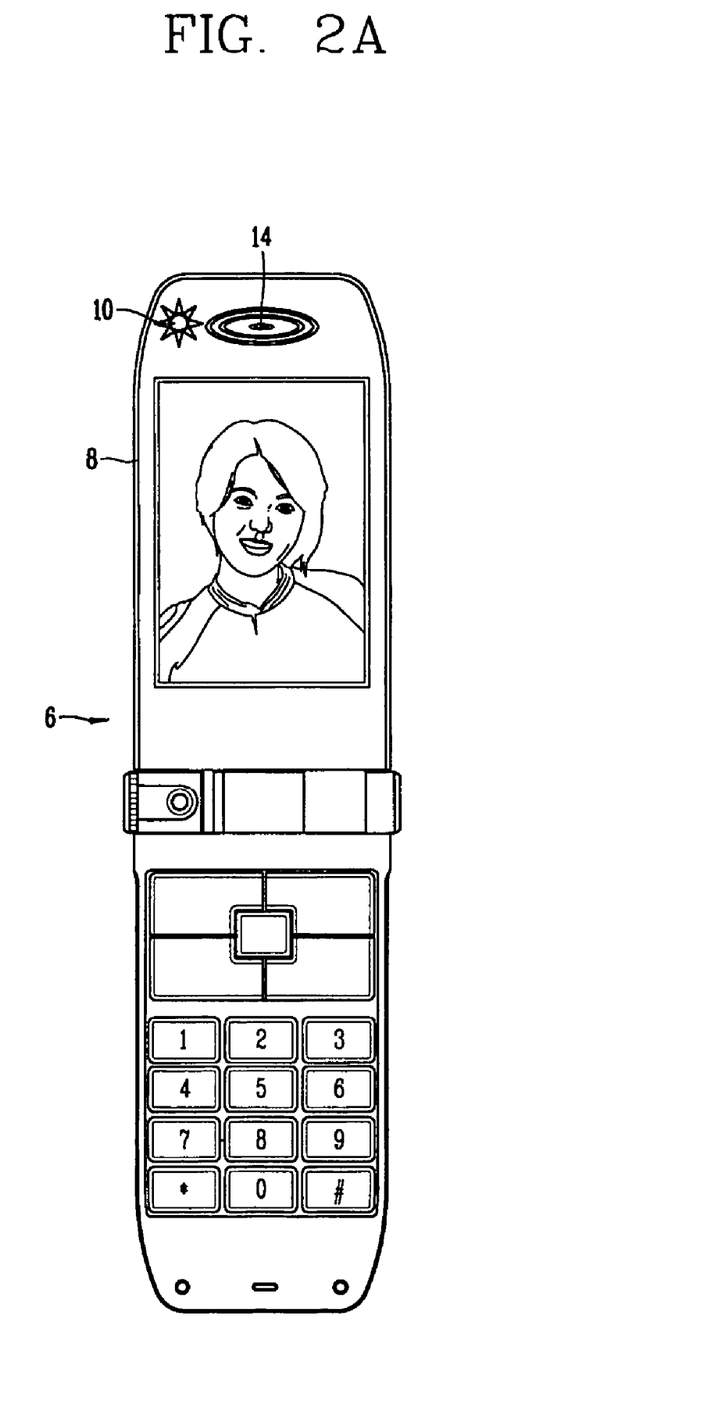
FIG. 2A is a front plan view of a mobile communication device configured in accordance with the present invention.
Figure 2B:
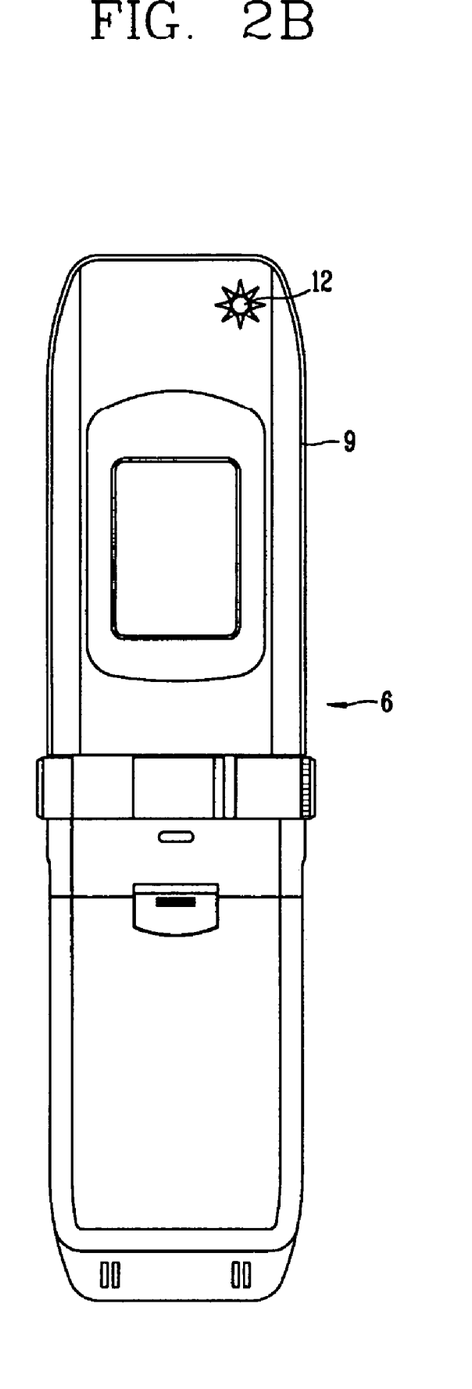
FIG. 2B is a back plan view of a mobile communication device configured in accordance with the present invention.

FIGS. 2A-2B generally illustrate a mobile communication device 6 comprising first and second optical sensors 10, 12 in accordance with a preferred embodiment of the present invention. First optical sensor 10 is preferably disposed on a front portion 8 of mobile communication device 6 in the general proximity of a speaker 14 of mobile communication device 6, as generally shown in FIG. 2A. Second optical sensor 12 is preferably disposed on a back portion 9 of mobile communication device 6, as generally shown in FIG. 2B. Each of first and second optical sensors (10, 12) is adapted to sense light in the general vicinity of mobile communication device 6. A person skilled in the art would readily appreciate that the location of each optical sensor as well as the number of optical sensors used in accordance with the general principles of the present invention may be varied by the mobile communication device manufacturer.

Figure 3:
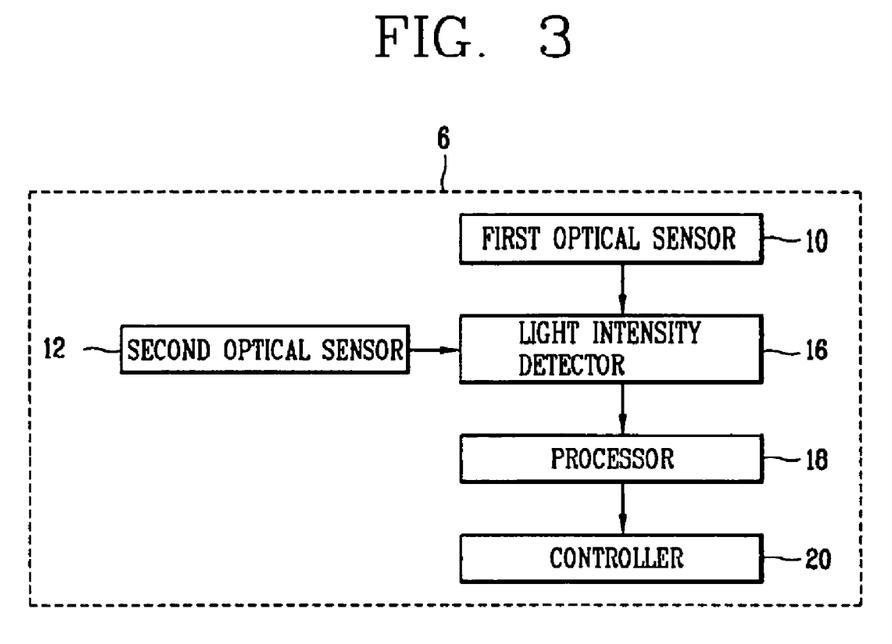
FIG. 3 is a component block diagram of the mobile communication device of FIGS. 2A-2B.

As generally depicted in FIG. 3, mobile communication device 6 also comprises a light intensity detector (LID) 16 operatively coupled between first optical sensor 10, second optical sensor 12, and a processor 18. LID 16 receives light input from first and second optical sensors 10, 12. LID 16 detects the intensity of light sensed by first and second optical sensors 10, 12, and generates corresponding light intensity output that is fed into processor 18. Processor 18 compares the intensity of light ($I_{F1}$) sensed by first optical sensor 10 with the intensity of light ($I_{F2}$) sensed by second optical sensor 12, i.e. determines the relative light intensity, and outputs a corresponding light intensity comparison signal ΔI, where $ΔI=|I_{F2}-I_{F1}|$, to a controller 20 (FIG. 3). Based on the comparison signal, controller 20 may suspend an image stream or resume a suspended image stream during an ongoing simultaneous image/voice transmission.

Figure 4A:
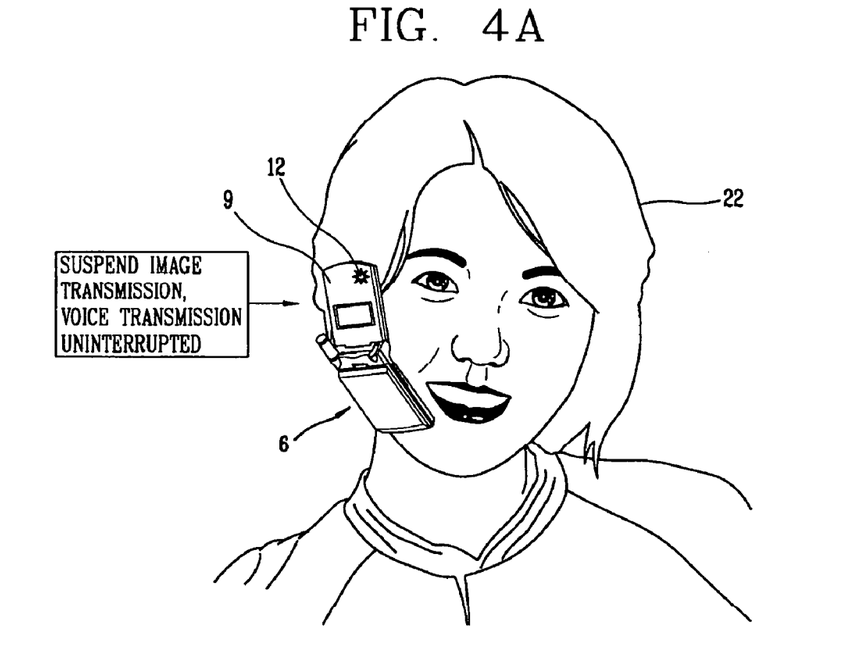
FIG. 4A is a schematic view of one embodiment of the present invention.

Specifically, if $ΔI≧ΔI_{REF}$ during an ongoing simultaneous image/voice transmission, where $ΔI_{REF}$ is a pre-set value, controller 20 concludes that user 22 has brought mobile communication device 6 in proximity to his/her ear, i.e. does not wish to view images any more, as generally depicted in FIG. 4A, and automatically suspends the image stream with the voice transmission portion going on uninterrupted.

Figure 4B:
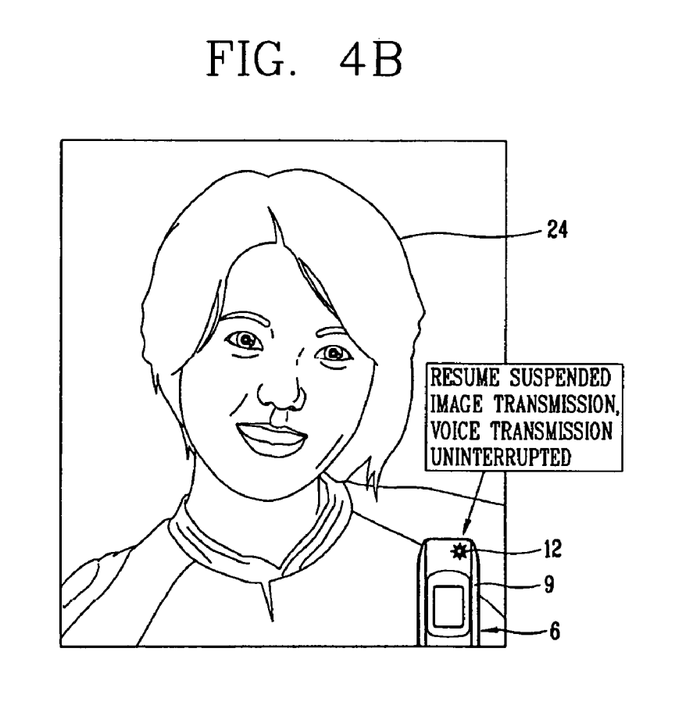
FIG. 4B is a schematic view of another embodiment of the present invention.

Alternatively, if $ΔI<ΔI_{REF}$ during an ongoing simultaneous image/voice transmission, controller 20 concludes that user 24 has pulled mobile communication device 6 away from his/her ear, i.e. may wish to view images again, as generally depicted in FIG. 4B, and automatically resumes the suspended image stream with the voice transmission portion going on uninterrupted.

A person skilled in the art would appreciate that the user may manually suspend an image stream during an ongoing simultaneous image/voice transmission by simply covering first optical sensor 10 with a finger or by bringing his/her finger in close proximity to first optical sensor 10, e.g., by partially or fully obstructing the view of first optical sensor 10, such as in the vicinity of device speaker 14 (FIG. 2A). The suspended image stream (image transmission portion) would automatically resume if the user were to remove his/her finger from first optical sensor 10 or move his his/her finger away from the vicinity of speaker 14, i.e. if the user were to no longer block or interfere with the light-sensing field of first optical sensor 10.

In accordance with another preferred embodiment of the present invention, mobile communication device 6 may operate as follows. After establishing connection with another communication device, as referenced by "Start" step 26 of FIG. 5, the user performs a simultaneous image/voice transmission, step 28, FIG. 5. LID 16 detects the intensity of light sensed by first and second optical sensors 10, 12 during the ongoing simultaneous image/voice transmission, step 30, FIG. 5. Processor 18 receives input from LID 16 representative of the detected light intensity and generates a light intensity comparison signal ΔI, step 32, FIG. 5.

Figure 5:
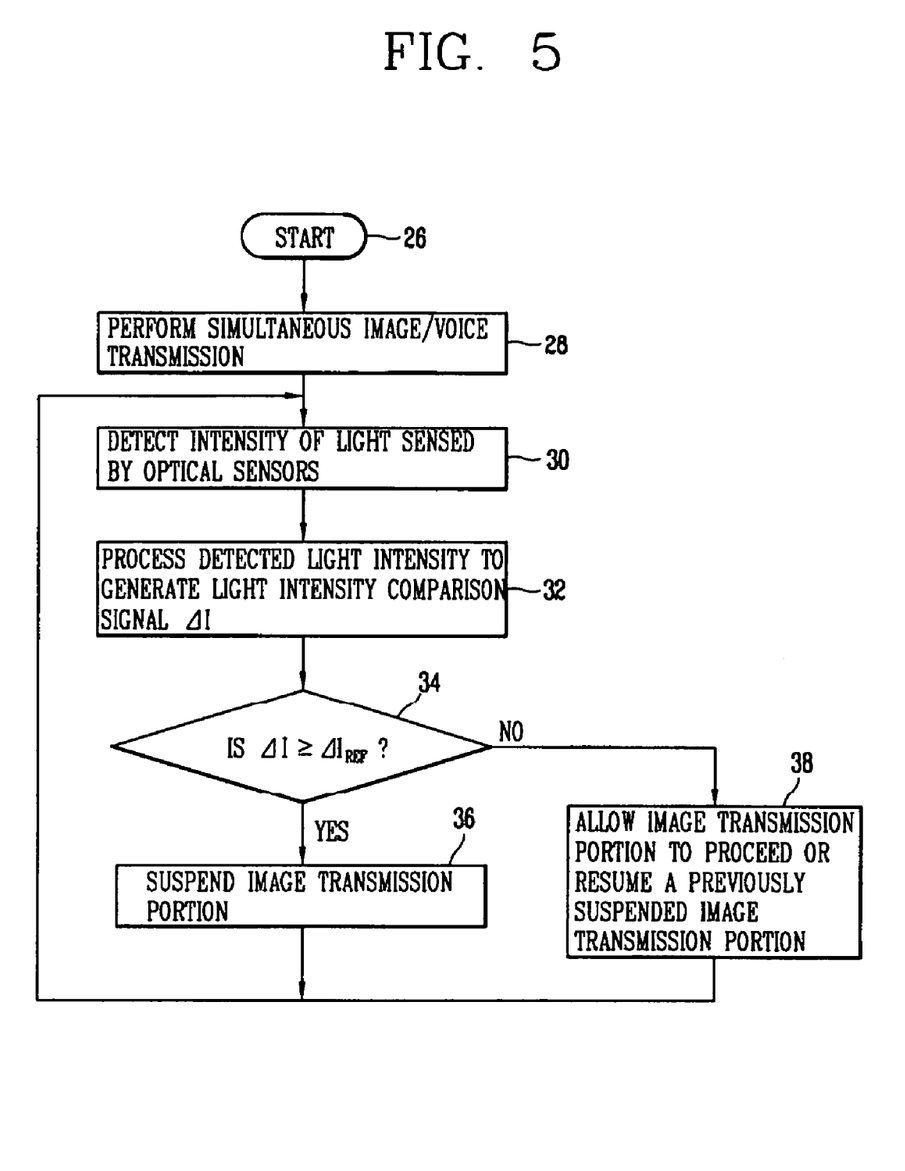
FIG. 5 is an operational flow chart in accordance with one embodiment of the present invention.

Controller, 20 determines whether $ΔI≧ΔI_{REF}$, where $ΔI_{REF}$ is a pre-set value, step 34, FIG. 5. If the answer is in the affirmative, controller 20 suspends the image transmission portion of the ongoing image/voice transmission with the voice transmission portion going on uninterrupted, step 36, FIG. 5, and the cycle repeats, as generally illustrated in FIG. 5. If the answer is in the negative, controller 20 allows the image transmission portion of the ongoing image/voice transmission to proceed simultaneously with the voice transmission portion, or resumes a previously suspended image transmission portion with the voice transmission portion going on uninterrupted, step 38, FIG. 5, and the cycle repeats.

The above-described novel setup reduces mobile communication device user inconvenience during simultaneous image/voice transmission by automating the entire procedure.

All terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

While the present invention has been described in detail with regards to several embodiments, it should be appreciated that various modifications and variations may be made in the present invention without departing from the scope or spirit of the invention. In this regard it is important to note that practicing the invention is not limited to the applications described hereinabove.

Many other applications and/or alterations may be utilized provided that such other applications and/or alterations do not deviate from the intended purpose of the present invention. Also, features illustrated or described as part of one embodiment can be used in another embodiment to provide yet another embodiment such that the features are not limited to the embodiments described above. Thus, it is intended that the present invention cover all such embodiments and variations as long as such embodiments and variations come within the scope of the appended claims and their equivalents.

What is claimed is:

1. A communication device with a camera for image transmission during communication, wherein the communication device is configured to:

sense the relative light intensity around a first portion of the communication device associated with reduced light intensity when communication is conducted with the communication device in proximity to a user's body or face; and allow image/voice transmission, suspend an image transmission portion without interrupting a voice transmission portion of an ongoing image/voice transmission, or resume the suspended image transmission portion based on, said the sensed relative light intensity by comparing the sensed relative light intensity with a reference light intensity required for the image transmission, wherein the relative light intensity is sensed so that the relative light intensity is reduced further and the sensed relative light intensity deviates further from the reference light intensity as a distance between the communication device and the user's body or face decreases so that the camera is at least partially blocked by the user's body or face when a speaker of the communication device is closely placed near the user's ear.

2. The communication device of claim 1 that allows the image transmission portion to proceed when the sensed relative light intensity is higher than the reference light intensity and suspends the image transmission portion when the sensed relative light intensity is lower than the reference light intensity.

3. The communication device of claim 2 that resumes the suspended image transmission portion when the sensed relative light intensity becomes higher than the reference light intensity.

4. A communication device configured to automatically control image transmission during an ongoing image/voice transmission, the device comprising:

means for detecting relative light intensity in the vicinity of a first portion associated with reduced light intensity during communication conducted in proximity to a user's body or face;

means for processing the detected relative light intensity; and at least one controller allowing image/voice transmission, suspending an image transmission portion without interrupting a voice transmission portion of the ongoing image/voice transmission, and resuming the suspended image transmission portion based on the processed relative light intensity.

5. The communication device of claim 4, wherein the means for detecting further detects light intensity in the vicinity of a second portion that is in the vicinity of the communication device.

6. The communication device of claim 5, wherein the relative light intensity is determined by comparing the intensity of light detected in the vicinity of the first portion and the second portion.

7. The communication device of claim 4, wherein the means for detecting comprises at least one light intensity detector receiving input from at least one optical sensor.

8. The communication device of claim 5, wherein the means for detecting comprises at least one light intensity detector receiving input from at least one optical sensor.

9. The communication device of claim 6, wherein the means for detecting comprises at least one light intensity detector receiving input from at least one optical sensor.

10. The communication device of claim 7, wherein the means for processing comprises at least one processor receiving input from the at least one light intensity detector.

11. The communication device of claim 8, wherein the means for processing comprises at least one processor receiving input from the at least one light intensity detector.

12. The communication device of claim 9, wherein the means for processing comprises at least one processor receiving input from the at least one light intensity detector.

13. The communication device of claim 10, wherein the at least one controller is operatively coupled to the at least one processor.

14. The communication device of claim 11, wherein the at least one controller is operatively coupled to the at least one processor.

15. The communication device of claim 12, wherein the at least one controller is operatively coupled to the at least one processor.

16. The communication device of claim 13, wherein the at least one optical sensor is disposed in close proximity to at least one device speaker.

17. The communication device of claim 14, wherein the at least one optical sensor is disposed in close proximity to at least one device speaker.

18. The communication device of claim 15, wherein the at least one optical sensor is disposed in close proximity to at least one device speaker.

19. A method of controlling image transmission in a communication device with a camera, the method comprising the detecting the relative light intensity in the vicinity of a portion of the communication device associated with reduced light intensity during communication conducted in proximity to a user's body or face;

processing the detected relative light intensity; and allowing image/voice transmission, suspending an image transmission portion without interrupting a voice transmission portion of an ongoing image/voice transmission, or resuming the suspended image transmission portion based on the processed relative light intensity, wherein the image transmission portion is allowed or resumed when the detected relative light intensity is higher than a reference light intensity required for the image transmission and suspended when the detected relative light intensity is lower than the reference light intensity, wherein the detected relative light intensity is processed so that the relative light intensity is reduced further and the detected relative light intensity deviates further from the reference light intensity as a distance between the communication device and the user's body or face decreases so that the camera is blocked by the user's body or face when a speaker of the communication device is closely placed near the user's ear.

20. The method of claim 19, wherein detecting the relative light intensity comprises comparing intensities of light sensed by at least two optical sensors.

21. The method of claim 20, further comprising:

comparing the processed detected relative light intensity with a pre-set value to determine whether to allow, suspend or resume the image transmission portion according to the comparison.

* * * * *